US012671722B2

(12) United States Patent
Vaiente

(10) Patent No.: US 12,671,722 B2
(45) Date of Patent: Jun. 30, 2026

(54) APPARATUSES, COMPUTER-IMPLEMENTED METHODS, AND COMPUTER PROGRAM PRODUCTS FOR SECURE BLUETOOTH LOW ENERGY COMMUNICATION

(71) Applicant: Honeywell International Inc., Charlotte, NC (US)

(72) Inventor: Gianni Vaiente, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 57 days.

(21) Appl. No.: 18/634,061

(22) Filed: Apr. 12, 2024

(65) Prior Publication Data

US 2025/0323954 A1 Oct. 16, 2025

(51) Int. Cl.
*H04L 9/40* (2022.01)
*H04L 29/06* (2006.01)
(Continued)

(52) U.S. Cl.
CPC ........ *H04L 63/205* (2013.01); *H04L 63/1433* (2013.01); *H04W 12/12* (2013.01); *H04W 12/50* (2021.01)

(58) Field of Classification Search
CPC ... H04L 63/205; H04L 63/1433; H04L 63/20; H04L 63/14; H04L 63/1441; H04W 12/50; H04W 12/12
See application file for complete search history.

(56) References Cited

U.S. PATENT DOCUMENTS

| | | | |
|---|---|---|---|
| 8,285,212 | B2 | 10/2012 | Hulvey et al. |
| 10,511,620 | B2 | 12/2019 | Schwartz et al. |

(Continued)

FOREIGN PATENT DOCUMENTS

| | | |
|---|---|---|
| CN | 112640513 A | 4/2021 |
| CN | 114238985 A | 3/2022 |

(Continued)

OTHER PUBLICATIONS

Arup Barua et al., "Security and Privacy Threats for Bluetooth Low Energy in IoT and Wearable Devices: A Comprehensive Survey," IEEE Open Journal of the Communications Society, 3:251-281, (Feb. 7, 2022).

(Continued)

*Primary Examiner* — Edward Zee
(74) *Attorney, Agent, or Firm* — ALSTON & BIRD LLP

(57) ABSTRACT

Embodiments of the disclosure provide for improved Bluetooth communication security in vehicles. In the context of a method, the method includes obtaining, from a computing device, at least one feature of a communication specification for a vehicle, wherein: the communication specification defines data sharing protocols between a sensor or computing device aboard the vehicle and a vehicle management system to enable wireless communication by a Bluetooth communication mode without disabling means of the sensor, computing device, or vehicle management system for communication by a second mode. The method includes generating a vulnerability of the communication specification based on the at least one feature; determining a mitigation operation based on the vulnerability; and providing a recommendation comprising the mitigation operation to the at least one computing device to enable modification of the communication specification toward reducing the vulnerability.

19 Claims, 4 Drawing Sheets

(51) Int. Cl.
  _H04W 12/12_      (2021.01)
  _H04W 12/50_      (2021.01)

(56)              References Cited

U.S. PATENT DOCUMENTS

| | | | |
|---|---|---|---|
| 2018/0124096 A1* | 5/2018 | Schwartz | H04W 8/22 |
| 2018/0205754 A1 | 7/2018 | North | |
| 2019/0258953 A1* | 8/2019 | Lang | G06N 3/08 |
| 2019/0394652 A1 | 12/2019 | Kim et al. | |
| 2021/0258328 A1 | 8/2021 | Appel et al. | |
| 2024/0073678 A1* | 2/2024 | Rey | H04W 4/80 |

FOREIGN PATENT DOCUMENTS

| | | |
|---|---|---|
| CN | 115185823 A | 10/2022 |
| CN | 115941305 A | 4/2023 |
| WO | 2022/116147 A1 | 6/2022 |

OTHER PUBLICATIONS

Extended European Search Report Mailed on Aug. 8, 2025 for EP Application No. 25165938, 10 page(s).

* cited by examiner

400

403
OBTAIINING ONE OR MORE FEATURES OF A
COMMUNICATION SPECIFICATION

406
GENERATING ONE OR MORE VULNERABILITIES

409
DETERMINING ONE OR MORE MITIGATION OPERATIONS

412
GENERATING IMPACT SCORES

415
GENERATING RANKING

418
PROVIDING RECOMMENDATION TO COMPUTING DEVICE

421
MODIFYING COMMUNICATION SPECIFICATION

APPARATUSES, COMPUTER-IMPLEMENTED METHODS, AND COMPUTER PROGRAM PRODUCTS FOR SECURE BLUETOOTH LOW ENERGY COMMUNICATION

TECHNOLOGICAL FIELD

Embodiments of the present disclosure are generally directed to supporting secure Bluetooth communication between devices aboard a vehicle.

BACKGROUND

Typical approaches to communication between vehicle systems, sensors, and or the like rely upon wired connections. For example, a vehicle control system may communicate with vehicle sensors and subsystems via wired connections to the corresponding computing elements. The use of wired connections to communicate with dozens to hundreds of vehicle elements may undesirably increase vehicle weight and maintenance complexity. As a result, wireless means of communication between vehicle elements may be used in place of wireless connections to achieve weight savings and reduce maintenance complexity. For example, vehicle elements may be configured to communicate via Bluetooth low energy (BLE). However, wireless approaches to vehicle system and sensor communication may demonstrate greater information security vulnerabilities as compared to wired approaches.

Applicant has discovered various technical problems associated with ensuring secure Bluetooth communication between vehicle elements. Through applied effort, ingenuity, and innovation, Applicant has solved many of these identified problems by developing the embodiments of the present disclosure, which are described in detail below.

BRIEF SUMMARY

In general, embodiments of the present disclosure herein provide for generation of vulnerabilities in Bluetooth communication specifications and determination of mitigation operations for reducing vulnerabilities. For example, embodiments of the present disclosure provide for generating one or more vulnerabilities of a communication specification based at least in part one or more features of the communication specification. Further, mitigation operations for modifying the communication specification to reduce one or more vulnerabilities may be generated and provisioned to an author of the communication specification. For example, a recommendation indicative of a mitigation operation may be generated and provisioned to a computing device with which an author of communication specification is associated. The mitigation operation may be performed automatically upon its determination or in response to user input from the computing device. Other implementations for securing Bluetooth communication in a vehicle will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for improved Bluetooth communication security is provided. The computer-implemented method is executable utilizing any of a myriad of computing device(s) and/or combinations of hardware, software, firmware. In some example embodiments an example computer-implemented method includes obtaining, from a computing device, at least one feature of a communication specification for a vehicle, wherein: the communication specification defines one or more data sharing protocols between at least one sensor or computing device aboard the vehicle and a vehicle management system to enable wireless communication by a Bluetooth communication mode without disabling means of the at least one sensor, computing device, or vehicle management system for communication by a second mode; generating at least one vulnerability of the communication specification based at least in part on the at least one feature; determining at least one mitigation operation based at least in part on the at least one vulnerability; and providing a recommendation comprising the at least one mitigation operation to the at least one computing device to enable modification of the communication specification toward reducing the at least one vulnerability.

In some embodiments, the method further includes generating a respective impact score for a plurality of mitigation operations, wherein the impact score indicates a predicted successfulness of the mitigation operation reducing the at least one vulnerability without introducing an additional vulnerability; and generating a ranking of the plurality of mitigation operations based at least in part on the impact scores, wherein the recommendation comprises a top-ranked subset of mitigation operations from the ranking. In some embodiments, the at least one feature comprises chipset configuration. In some embodiments, the at least one feature comprises key configuration. In some embodiments, the at least one feature comprises encryption configuration. In some embodiments, the at least one feature comprises operating system version.

In some embodiments, the at least one feature comprises at least one supported mode; and the at least one supported mode comprises at least one of Bluetooth low energy (BLE) or basic rate/enhanced data rate (EDR). In some embodiments, the second mode comprises at least one of wired communication, wireless fidelity (WiFi), or satellite communication (SATCOM). In some embodiments, the at least one mitigation operation comprises at least one of adjusting at least one setting of a computing device of the vehicle, installing at least one program on the computing device of the vehicle, or modifying at least one installed program of the computing device of the vehicle. In some embodiments, the at least one mitigation operation comprises at least one of enforcing valid curve points in the Bluetooth communication mode or enforcing encryption in the Bluetooth communication mode.

In some embodiments, the at least one vulnerability comprises pairing method confusion. In some embodiments, the at least one vulnerability comprises BleedingBit. In some embodiments, the at least one vulnerability comprises fixed coordinate invalid curve exploit. In some embodiments, the at least one vulnerability comprises SweynTooth. In some embodiments, the at least one vulnerability comprises BLURtooth. In some embodiments, the at least one vulnerability comprises at least one of bluetooth low energy spoofing attack (BLESA) or InjectaBLE. In some embodiments, the at least one vulnerability comprises at least one of key hierarchy enumeration, or key negotiation of Bluetooth (KNOB). In some embodiments, the method further includes modifying the communication specification based at least in part on the at least one mitigation operation.

In accordance with another aspect of the present disclosure, a computing apparatus for improved Bluetooth communication security is provided. The computing apparatus in some embodiments includes at least one processor and at least one non-transitory memory, the at least non-transitory one memory having computer-coded instructions stored thereon. The computer-coded instructions in execution with the at least one processor causes the apparatus to perform any one of the example computer-implemented methods described herein. In some other embodiments, the computing apparatus includes means for performing each step of any of the computer-implemented methods described herein.

In accordance with another aspect of the present disclosure, a computer program product for improved Bluetooth communication security is provided. The computer program product in some embodiments includes at least one non-transitory computer-readable storage medium having computer program code stored thereon. The computer program code in execution with at least one processor is configured for performing any one of the example computer-implemented methods described herein.

BRIEF DESCRIPTION OF THE DRAWINGS

Figure 1:
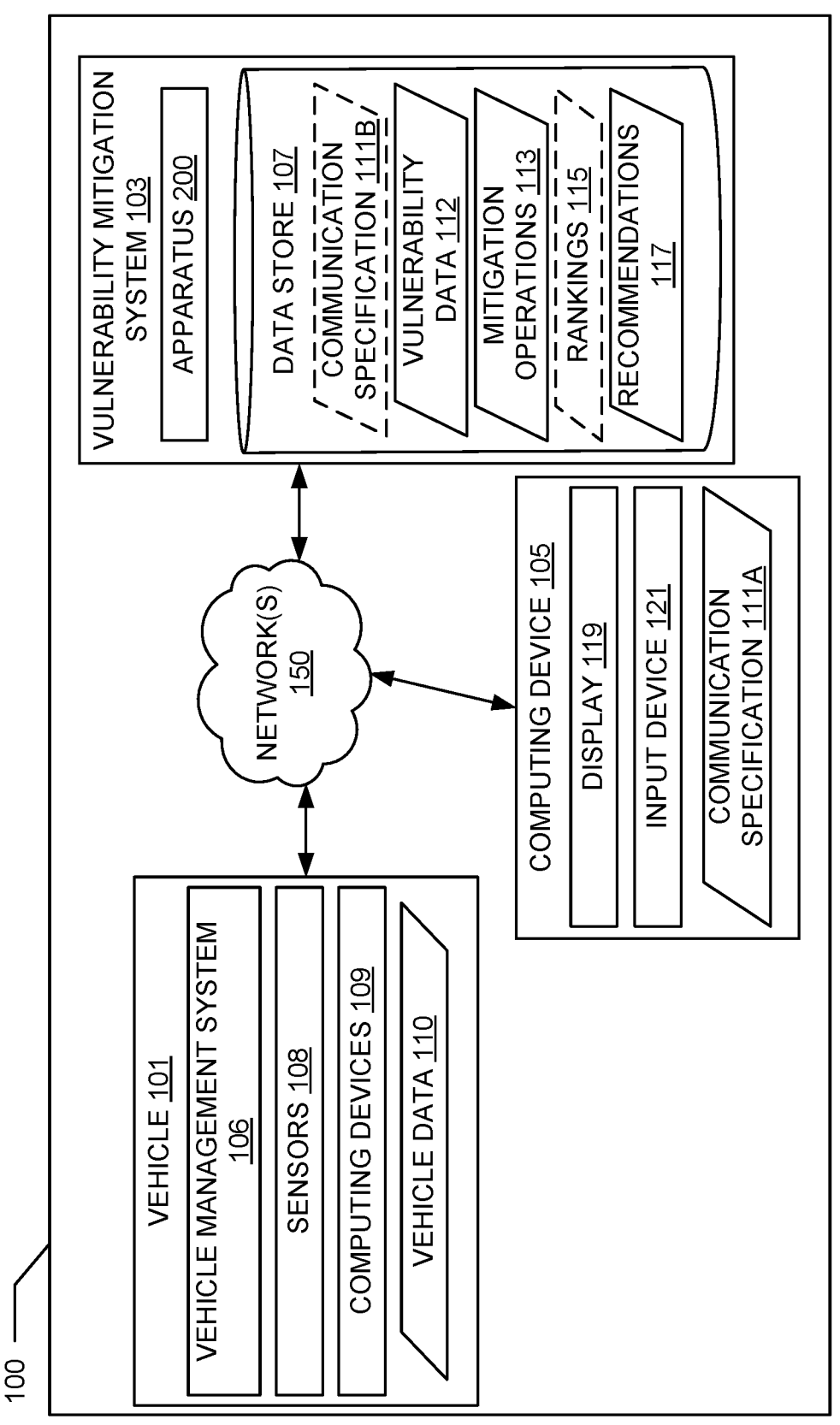

Having thus described the embodiments of the disclosure in general terms, reference now will be made to the accompanying drawings, which are not necessarily drawn to scale, and wherein:

FIG. 1 illustrates a block diagram of a networked environment that may be specially configured within which embodiments of the present disclosure may operate.

Figure 2:
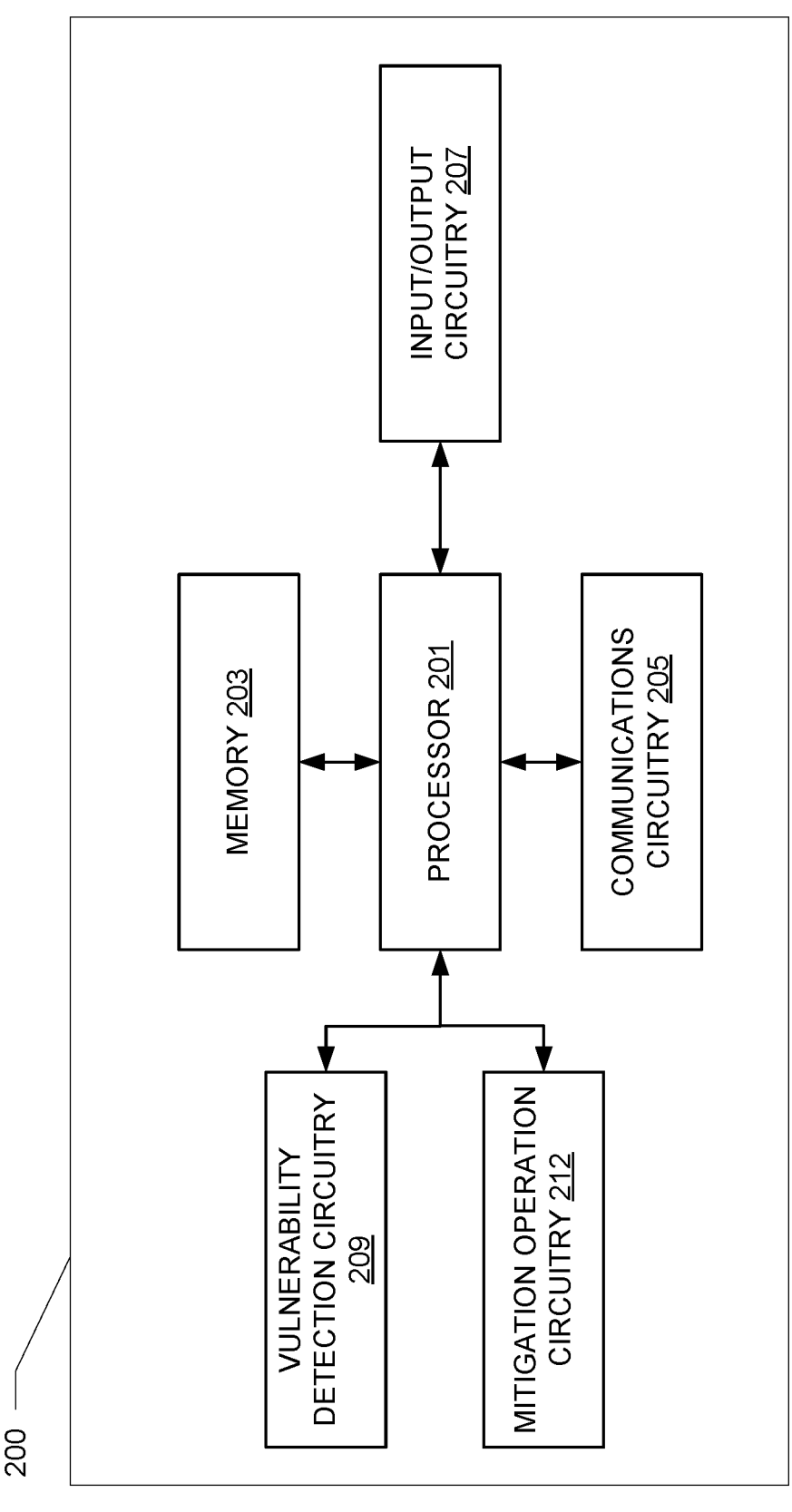

FIG. 2 illustrates a block diagram of an example apparatus that may be specially configured in accordance with at least some example embodiments of the present disclosure.

Figure 3:
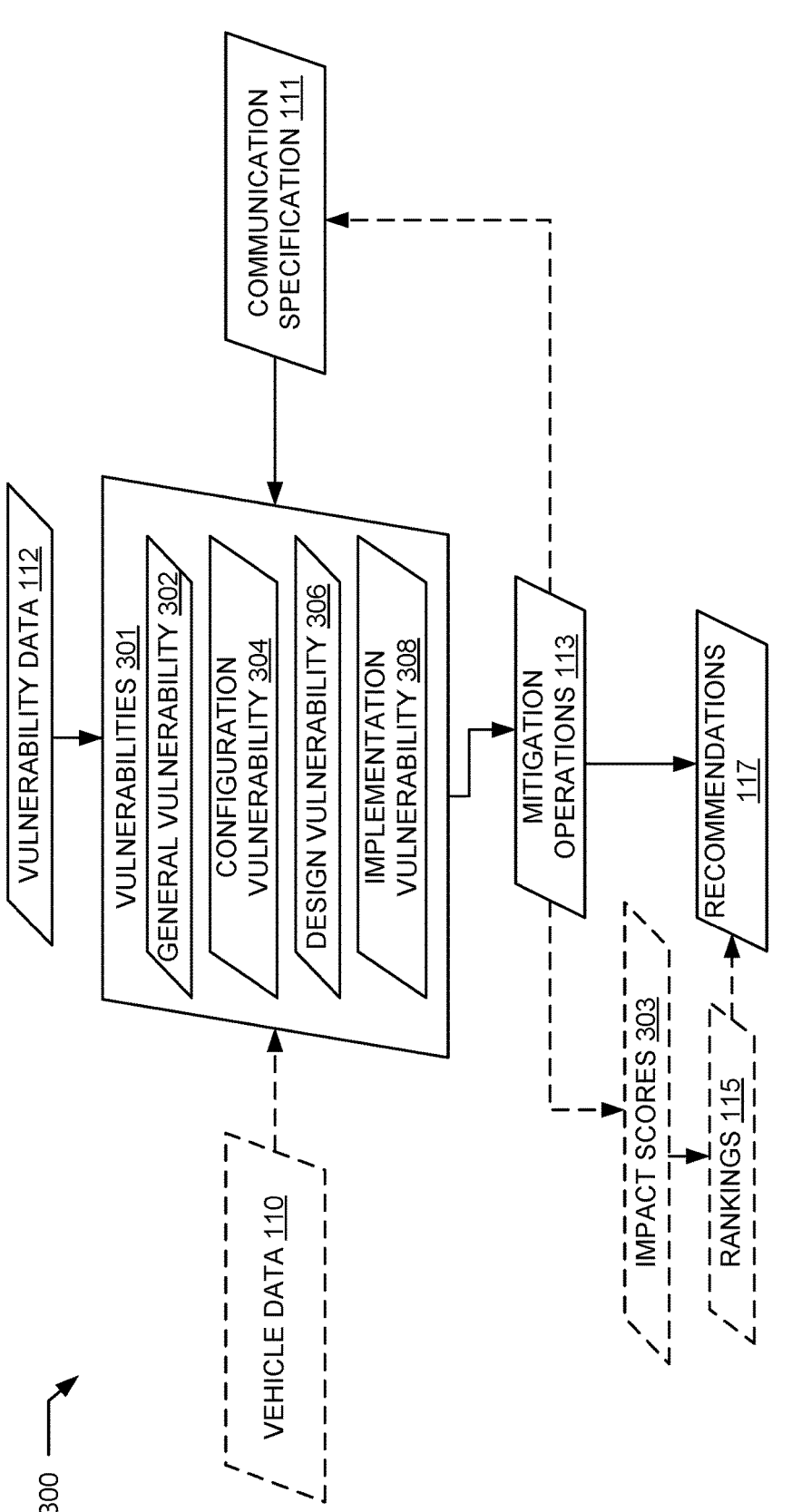

FIG. 3 illustrates an example data architecture in accordance with at least some example embodiments of the present disclosure.

Figure 4:
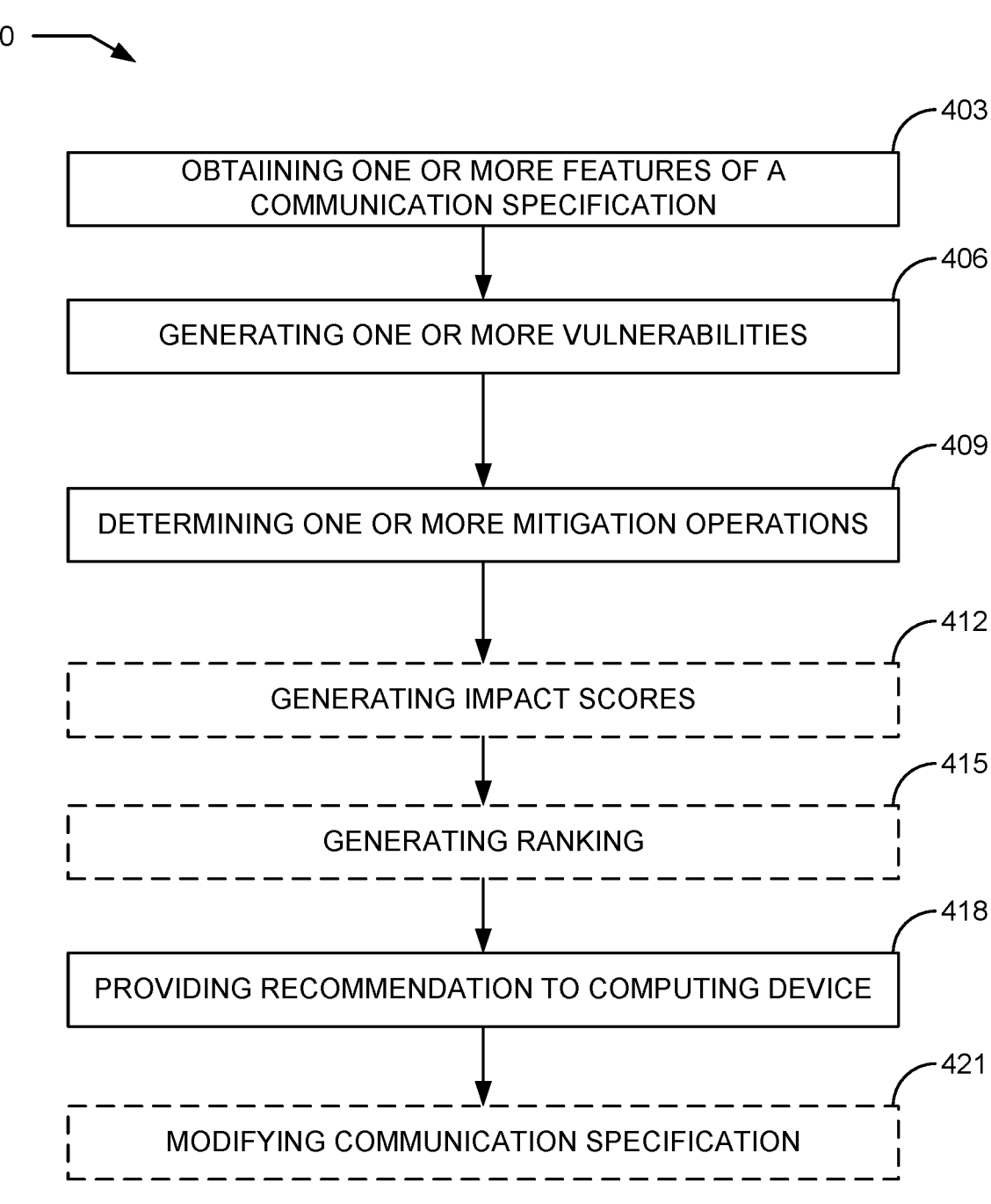

FIG. 4 illustrates a flowchart depicting operations of an example process for supporting secure Bluetooth communication frameworks in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Embodiments of the present disclosure provide a myriad of technical advantages in the technical field of supporting secure Bluetooth communication between elements of a vehicle. For example, the present method, apparatus, and computer program product may enable use of Bluetooth communication modes for computing devices, sensors, and/or the like aboard a vehicle. Existing approaches to facilitating communication between system elements rely upon wired connections, wireless fidelity (WiFi) connections, satellite communication (SATCOM) connections, and/or the like. Wired approaches may be disadvantageous due to added vehicle weight and increased complexity of access and maintenance. Wireless approaches (e.g., WiFi and SAT- COM) may be disadvantageous in instances where communications between multiple vehicle elements and/or communications between vehicle elements and an external computing environment require frequent disconnections and reconnections from and to multiple networks.

In such instances, implementation of Bluetooth interfaces may enable transfer of data between close proximity devices without requiring disconnection from WiFi or SATCOM networks (e.g., and associated functionality, such as cloud services). For example, introduction of Bluetooth communication to onboard vehicle devices may eliminate a need for a device to disconnect from its current network to connect and send data to another device, such as a maintenance application running on a tablet. However, a lack of consistent standards and best practices may render Bluetooth communication infeasible for implementation in vehicle environments, which are associated with higher emphasis on cybersecurity and safeguards against exploitation.

Embodiments of the present disclosure overcome the technical challenges of ensuring security of Bluetooth-enabled devices aboard a vehicle by providing means for generating vulnerabilities in Bluetooth communication specifications and determining one or more mitigation operations for reducing the vulnerabilities. The various embodiments of the present disclosure may provide a recommendation indicative of one or more vulnerabilities, mitigation operations, and/or the like to a computing device associated with an author or responsible entity associated with the communication specification. In doing so, the method, apparatus, and computer program product may enable modification of communication specifications (and corresponding onboard vehicle elements) toward reducing the one or more vulnerabilities. As a result, implementation of Bluetooth-based communication between system elements may be practically performed due to increased confidence of security.

Definitions

"Vehicle" refers to any apparatus that traverses throughout an environment by any mean of travel. In some contexts, a vehicle transports goods, persons, and/or the like, or traverses itself throughout an environment for any other purpose, by means of air, sea, or land. In some embodiments, a vehicle is ground-based, air-based, water-based, space-based (e.g., outer space or within an orbit of a planetary body, a natural satellite, or artificial satellite), and/or the like. In some embodiments, the vehicle is an aerial vehicle capable of air travel. Non-limiting examples of aerial vehicles include urban air mobility vehicles, drones, helicopters, fully autonomous air vehicles, semi-autonomous air vehicles, airplanes, orbital craft, spacecraft, rotorcraft, and/or the like. In some embodiments, the vehicle is piloted by a human operator onboard the vehicle. For example, in an aerial context, the vehicle may be a commercial airliner operated by a flight crew. In some embodiments, the vehicle is remotely controllable such that a remote operator may initiate and direct movement of the vehicle. Additionally, in some embodiments, the vehicle is unmanned. For example, the vehicle may be a powered, aerial vehicle that does not carry a human operator and is piloted by a remote operator using a control station. In some embodiments, the vehicle is an aquatic vehicle capable of surface or subsurface travel through and/or atop a liquid medium (e.g., water, water-ammonia solution, other water mixtures, and/or the like). Non-limiting examples of aquatic vehicles include unmanned underwater vehicles (UUVs), surface watercraft (e.g., boats, jet skis, and/or the like), amphibious watercraft, hovercraft, hydrofoil craft, and/or the like. As used herein, vehicle may refer to vehicles associated with urban air mobility (UAM).

"UAM" refers to urban air mobility, which includes all aerial vehicles and functions for aerial vehicles that are capable of performing vertical takeoff and/or vertical landing procedures. Non-limiting examples of UAM aerial vehicles include passenger transport vehicles, cargo transport vehicles, small package delivery vehicles, unmanned aerial system services, autonomous drone vehicles, and ground-piloted drone vehicles, where any such vehicle is capable of performing vertical takeoff and/or vertical landing.

"Communication specification" refers to any data objective indicative or descriptive of protocols for sharing data between elements of a vehicle. In various embodiments, a communication specification includes any number of computer-readable files, instructions, and/or the like that define parameters of data sharing between a vehicle management system of a vehicle, one or more additional systems of the vehicle (e.g., embodied as one or more computing devices), one or more sensors of the vehicle, and/or the like. For example, a communication specification may include any number of document files, technical descriptions, design documentations, graphical diagrams, part specifications, and/or the like that define one or more data sharing protocols between elements of a vehicle. In some embodiments, a communication specification includes one or more user inputs. For example, a communication specification may include one or more user inputs indicative of whether one or more features are applicable to or present in one or more data sharing protocols.

"Feature" refers to any element or group of elements of a communication specification. In some embodiments, a feature includes any number of versions, configurations, settings, and/or the like of processes or apparatuses associated with sharing data between elements of a vehicle (e.g., vehicle management system, subsystems, sensors, and/or the like). In some embodiments, a feature is associated with one or more communication modes including BLE communication, wired communication, WiFi communication, SATCOM, and/or the like. In one example, a feature may include BLE encryption configuration. As another example, a feature may include operating system version of one or more computing devices of the vehicle. In another example, a feature may include one or more supported Bluetooth modes, such as BLE, basic rate/enhanced data rate (EDR), and/or the like.

"Vulnerability" refers to any action, process, activity, and/or the like that may result in exploitation, exposure, or disruption of vehicle operations by an unauthorized entity. In some embodiments, a vulnerability includes a risk of successful performance of said action, process, or activity. For example, a vulnerability may include a risk that an unauthorized entity may initiate a Bluetooth chip-level, proximity-based process to take over a communication access point of a vehicle without detection (e.g., BleedingBit). In another example, a vulnerability may include a risk of successful performance of a fixed coordinate invalid curve attack, which may compromise encryption keys used in Bluetooth pairing. In various embodiments, the present method, apparatus, and computer program product are configured to determine whether one or more aspects of a communication specification (or one or more features thereof) are associated with one or more vulnerabilities.

"Mitigation operation" refers to electronically managed data outputtable via at least one computing device that indications one or more actions, processes, activities, and/or the like that may be performed to reduce the risk of a vehicle to exploitation, exposure, or disruption via one or more vulnerabilities. In various embodiments, a mitigation operation includes modifying a communication specification to reduce one or more vulnerabilities. For example, a mitigation operation may include modifying a communication specification of a vehicle such that one or more changes to one or more computing devices of a vehicle (or actions performed thereby) may be implemented. In some embodiments, a mitigation operation is performed to reduce the likelihood of or prevent unauthorized activities, processes, and actions in Bluetooth-based communications, such as encryption or decryption of data, Bluetooth pairing, Bluetooth spoofing, and/or the like. In various embodiments, performance of a mitigation operation includes adjusting one or more computing devices, processes, and/or the like of a vehicle. For example, a mitigation operation may include adjusting settings, configurations, and/or the like of one or more Bluetooth-enabled computing devices of a vehicle. As another example, performance of a mitigation operation may include adjusting one or more encryption processes utilized by vehicle elements in Bluetooth communication, such as enforcing valid curve points, implementing particular key generation algorithms, updating firmware, hardware, and/or or software, and/or the like. The mitigation operation may be generated by a model, or plurality of models, as described herein. The mitigation operation may be embodied at least in part as a command provided to one or more computing elements described herein, such as a computing device of an author of a communication specification.

"Recommendation" refers to any data object indicative of one or more mitigation operations. The recommendation may be indicated to a user in any suitable electronic format, including, but not limited to, electronic reports, electronic mail, telephone calls, audible alerts, computer voice, SMS text message, and updates to displays and/or graphical user interfaces (GUIs). For example, a recommendation may include a text-formatted indication of one or more mitigation operations. As another example, a recommendation may be rendered on a display of one or more computing devices accessible to a user associated with a communication specification, vehicle, and/or the like.

"Ranking" refers to a relationship between two or more data objects, such as a list of two or more mitigation operations in which an ordering of the mitigations actions in the list is based at least in part on values of one or more impact scores associated with the two or more mitigation operations. In one example, a ranking includes a plurality of mitigation operations in which an ordering of the plurality of mitigation operations is based at least in part on a predicted impact of each mitigation operation in reducing one or more vulnerabilities.

"Impact score" refers to any metric by which the benefit of a mitigation operation in reducing one or more vulnerabilities may be measured. For example, an impact score may be a quantitative indicative of whether (or to what degree) the implementation of a mitigation operation will prevent performance of one or more unauthorized activities, actions, processes, and/or the like. Additionally, or alternatively, in some embodiments, an impact score indicates a level of complexity, resource cost, and/or the like associated with implementation of a mitigation operation.

"Model" refers to any algorithmic and/or machine learning model that generates a particular output, or plurality thereof, based at least in part on one or more inputs. Non-limiting examples of models include regression models, dimensionality reduction models, ensemble learning models, reinforcement learning models, supervised learning models, unsupervised learning models, semi-supervised learning models, Bayesian models, decision tree models, linear classification models, artificial neural networks, association rule learning models, hierarchical clustering models, cluster analysis models, anomaly detection models, deep learning models, feature learning models, and combinations thereof.

Example Systems and Apparatuses of the Disclosure

FIG. 1 illustrates a block diagram of a networked environment that may be specially configured within which embodiments of the present disclosure may operate. Specifically, FIG. 1 depicts an example networked environment 100. As illustrated, the networked environment 100 includes one or more vehicles 101, a vulnerability mitigation system 103, and a computing device 105. In some embodiments, the computing device 105 is associated with one or more authors of a communication specification 111A, 111B for one or more vehicles 101. In some embodiments, the vehicle 101 includes a vehicle management system 106, one or more sensors 108, one or more computing devices 109, and/or the like. In various embodiments, the vulnerability mitigation system 103 is configured to generate vulnerabilities based one or more features of a communication specification 111A, 111B. In some embodiments, the vulnerability mitigation system 103 is further configured to determine one or more mitigation operations 113 for reducing the one or more vulnerabilities. In some embodiments, the vulnerability mitigation system 103 generates and provisions to computing devices 105 one or more recommendations for mitigation operations 113.

In various embodiments, the vehicle management system 106, sensors 108, computing devices 109, and/or the like are configured to communicate with one another and/or other remote computing environments via one or more modes including wireless communication, WiFi communication, SATCOM, and/or the like. In some embodiments, as defined by a communication specification 111A, 111B, one or more data sharing protocols are configured between the vehicle management system 106, sensors 108, computing devices 109, and/or the like. The one or more data sharing protocols may enable the vehicle management system 106, sensors 108, computing devices 109, and/or the like to communicate wirelessly via a Bluetooth communication mode without disabling means for said elements to communicate via a second communication mode (e.g., wired communication, WiFi, SATCOM, and/or the like). For example, the vehicle management system 106, sensors 108, computing devices 109, and/or the like may include Bluetooth modules and WiFi modules such that communication processes may be conducted simultaneously and/or in parallel via Bluetooth mode and WiFi mode.

In some embodiments, the vehicle management system 106 is configured to receive and process vehicle data 110 from one or more sensors 108, computing devices 109, and/or the like. In various embodiments, vehicle data 110 includes readings from one or more sensors, output data generated by one or more computing devices 109, inputs received via one or more computing devices 109, data received from one or more external computing environments, and/or the like. For example, the vehicle data 110 may include sensor readings indicative of one or more vehicle statuses (e.g., fuel level, engine temperature, vehicle speed, and/or the like). In another example, the vehicle data 110 may include vehicle position, vehicle component statuses (e.g., component configuration, health, failure, fault, and/or the like), control inputs, and/or the like. In some embodiments, the vehicle management system 106 is configured to provision vehicle data 110 to the computing device 105, vulnerability mitigation system 103, and/or the like. For example, the vulnerability mitigation system 103 may receive vehicle data 110 from the vehicle management system 106 such that the vulnerability mitigation system 103 may determine one or more vulnerabilities and/or generate one or more mitigation operations (or rankings thereof) based at least in part on the vehicle data 110.

In some embodiments, the computing device 105 includes a personal computer, laptop, smartphone, tablet, Internet-of-Things enabled device, smart home device, virtual assistant, alarm system, workstation, work terminal, work portal, and/or the like. In some embodiments, the computing device 105 is configured to generate and provision to the vulnerability mitigation system 103 a communication specification 111A. In some embodiments, the communication specification 111A is associated with one or more vehicles 101, vehicle types, and/or the like. The associated vehicle 101 may embody a vehicle design that is yet to be manufactured. Additionally, or alternatively, the associated vehicle 101 may embody a manufactured vehicle 101.

In some embodiments, the computing device 105 includes one or more displays 119 by which data corresponding to one or more vehicles 101, recommendations 117, mitigation operations 113, communication specifications 111A, vulnerabilities, and/or the like is/are displayed to a user of the computing device 105. For example, the display 119 may include renderings of graphical user interfaces comprising recommendations 117, communication specification-related queries, mitigation operations 113, and/or the like. In some embodiments, the display 119 includes a CRT (cathode ray tube), LCD (liquid crystal display) monitor, LED (light-emitting diode) monitor, touchscreen monitor, and/or the like, for displaying information/data to a user of the computing device 105. In some embodiments, the computing device 105 includes one or more input devices 121 for receiving user inputs, such as inputs for generating a communication specification 111A, responding to queries, determining vulnerabilities, generating one or more mitigation operations 113, initiating one or more mitigation operations 113, and/or the like. In some embodiments, the input device 121 include one or more buttons, cursor devices, touch screens, including three-dimensional or pressure-based touch screens, camera, finger print scanners, accelerometer, retinal scanner, gyroscope, magnetometer, or other input devices.

In some embodiments, the vulnerability mitigation system 103 includes an apparatus 200 configured to perform various functions and actions related to enacting techniques and processes described herein for generating vulnerabilities of Bluetooth data sharing protocols, determining mitigation actions, and generating and provisioning recommendations to computing devices 105. In some embodiments, the apparatus 200 is configured to provide data to and receive data from one or more vehicles 101, computing devices 105, and/or the like. For example, the apparatus 200 may receive vehicle data 110 from the vehicle 101. As another example, the apparatus 200 may receive communication specifications 11A, user inputs, and/or the like from the computing device 105. In some embodiments, the apparatus 200 includes one or more data stores 107. The various data in the data store 107 may be accessible to one or more of the vehicle 101, the computing device 105 and/or the like. The data store 107 may be representative of a plurality of data stores 107 as can be appreciated. The data stored in the data store 107, for example, is associated with the operation of the various applications, apparatuses, and/or functional entities described herein. The data stored in the data store 107 may include, for example, communication specifications 111B, vulnerability data 112, mitigation operations 113, rankings 115, recommendations 117, and/or the like.

In some embodiments, a communication specification 111A, 111B includes one or more data sharing protocols defining communication between elements of the vehicle 101. For example, a communication specification 111A, 111B may define one or more data sharing protocols between one or more sensors 108 or computing device 109 aboard the vehicle 101 and the vehicle management system 106 to enable wireless communication by a Bluetooth communication mode without disabling means of the sensors 108, computing devices 109, or vehicle management system 106 for communication by a second mode (e.g., wired communication, WiFi, SATCOM, and/or the like).

In some embodiments, a communication specification 111A, 111B comprises one or more features that embody respective data sharing protocols. In some embodiments, a feature includes one or more parameters, settings, configurations, and/or the like of Bluetooth encryption, Bluetooth pairing, Bluetooth transmission, and/or the like. For example, features may include frequency bands, channel settings, channel usages, modulation settings, data rates, transmission powers, transmission sensitivities, transmission/reception ranges, data transports, communication topologies, positioning features, direction finding methods, and/or the like. In another example, features may include physical layer type, packet type, device address settings, host-controller interface (HCI) transport types, and/or the like. Further example features may include encryption configurations (e.g., RSA encryption, AES encryption, and/or the like), key generation configurations, key generation inputs, security modes, security mode levels, pairing methods, pairing settings, advertisement intervals, and/or the like. In still another example, features may include supported modes (e.g., low energy, basis rate/enhanced data rate, and/or the like), chipset configuration, operating system version, and/or the like.

In some embodiments, vulnerability data 112 includes information defining one or more vulnerabilities of Bluetooth communication. For example, the vulnerability data 112 may include one or more knowledge bases indicative and/or descriptive of historical Bluetooth communication vulnerabilities, classifications, techniques, exploitations, targets, and/or the like. In some embodiments, the vulnerabilities include general vulnerabilities, configuration vulnerabilities, design vulnerabilities, implementation vulnerabilities, and/or the like. Example aspects of general vulnerabilities, configuration vulnerabilities, design vulnerabilities, implementation vulnerabilities, and/or the like are further discussed herein with reference to the data architecture 300 shown in FIG. 3.

In some embodiments, the mitigation operations 113 includes one or more actions, processes, activities, and/or the like that may be performed to reduce the risk of a vehicle to exploitation, exposure, or disruption via one or more vulnerabilities. In some embodiments, a respective mitigation operation 113 includes one or more associations between the mitigation operation and one or more vulnerabilities. In some embodiments, an association between a respective mitigation operation 113 and a vulnerability indicates whether the implementation of the mitigation operation may reduce the vulnerability. Additionally, in some embodiments, a respective mitigation operation 113 includes one or more adverse associations between the mitigation operation and one or more additional vulnerabilities, where the adverse associations indicate that implementation of the mitigation operation may increase a respective vulnerability (e.g., by rendering the vehicle 101 more susceptible to unauthorized actions, activities, processes, and/or the like with which the vulnerability is associated). For example, for each of a plurality of vulnerabilities a mitigation operation 113 may include a respective monotonic relationship indicative of whether the mitigation operation 113 increases or reduces susceptibility of the vehicle 101 to the vulnerability.

In some embodiments, the relationships between a respective mitigation operation 113 and one or more vulnerabilities are determined via one or more models. For example, the data store 107 may include one or more decision trees, lookup tables, machine learning models, and/or the like by which a predicted relationship between a mitigation operation and a vulnerability may be determined. In some embodiments, a relationship between a respective mitigation operation 113 and a vulnerability action is expressed via an impact score that indicates a level of likelihood of reducing the vulnerability upon implementation of the mitigation operation 113. In various embodiments, a mitigation operation includes modifying a communication specification 111A, 111B to adjust one or more features, where said adjustment may cause configuration of the vehicle management system 106, sensors 108, computing devices 109, and/or the like based at least in part on the modified communication specification 111A, 111B.

In some embodiments, a ranking 115 includes a plurality of mitigation operations 113 in which an ordering of the mitigation operations in the ranking is based at least in part on associated impact scores for reducing one or more vulnerabilities. For example, a ranking 115 may be associated with a particular vulnerability and include a plurality of possible mitigation operations for reducing susceptibility of a vehicle 101 to the particular vulnerability. One or more models (e.g., decision tree frameworks, trained machine learning models, and/or the like) may generate an estimated impact score of a respective mitigation operation 113 toward reducing the particular vulnerability based at least in part on a communication specification 111A, 111B and vulnerability data 112. A ranking 115 for the particular vulnerability may be generated based at least in part on the respective impact scores for a plurality of mitigation operations 113. A top-ranked entry of the ranking 115 may correspond to a mitigation operation 113 that is predicted to provide the greatest impact in reducing the vulnerability.

In some embodiments, a recommendation 117 indicates one or more mitigation operations 113. Additionally, or alternatively, in some embodiments, a recommendation 117 indicates one or more vulnerabilities with which the mitigation operation 113 is associated. In some embodiments, a recommendation 117 includes one or more rankings 115. For example, a recommendation 117 may indicate a first vulnerability and include a first ranking 115 comprising a first set of mitigation operations 113 for reducing the first vulnerability. The recommendation 117 may further indicate a second vulnerability and include a second ranking 115 comprising a second set of mitigation operations 113 for reducing the second vulnerability. In some embodiments, the recommendation 117 includes electronic reports, electronic mail, telephone calls, audible alerts, computer voice, SMS text message, and updates to displays and/or (GUIs) that may be provisioned to and rendered on a display 119 of a computing device 105. For example, the apparatus 200 may cause rendering of a GUI on the display 119. In some embodiments, a GUI comprises one or more selectable fields. A respective selectable field may be associated with a mitigation operation 113. In some embodiments, in response to the computing device 105 receiving user input selecting a selectable field, the apparatus 200 or computing device 105 causes modification of the communication specification 111A, 111B based at least in part on the mitigation operation with which the selectable field is associated.

In some embodiments, a recommendation includes a listing of vulnerabilities and a notation schema indicative of whether a respective vulnerability is present, potentially present, or not present in a communication specification 111A, 111B. For example, a rendering of a GUI may indicate a plurality of vulnerabilities, where each vulnerability is rendered in one of a plurality of colors based at least in part on whether a communication specification 111A, 111B includes a feature that is predicted to render the vehicle 101 susceptible to the vulnerability. As one example of a notation schema, a vulnerability that is not associated with the communication specification 111A, 111B may be rendered in green color, a vulnerability that is potentially associated with the communication specification 111A, 111B (or where association is indeterminant) may be rendered in yellow color, and a vulnerability that is definitively associated with the communication specification 111A, 111B may be rendered in green color.

Additional example aspects of the communication specification 111A, 111B, vulnerability data 112, mitigation operations 113, rankings 115, and recommendations 117 are shown in the data architecture 300 FIG. 3 and described herein.

In some embodiments, the apparatus 200 is configured to obtain one or more features of a communication specification 111A, 111B. In some embodiments, the apparatus 200 receives a communication specification 111A from a computing device 105 and stores the communication specification as an entry at the data store 107 (e.g., represented as communication specification 111B). In some embodiments, the apparatus 200 is configured to perform one or more optical character recognition processes, keyword recognition processes, and/or the like to process a communication specification 111B and obtain one or more features as an output. For example, the apparatus 200 may compare textual content of a communication specification 111B to a corpus of terms, definitions, and/or the like for a plurality of features, vulnerabilities, and/or the like. The apparatus 200 may generate one or more features of the communication specification 111B based at least in part on the respective comparisons. Additionally, or alternatively, in some embodiments, the apparatus 200 is configured to cause rendering of a GUI on the display 119 of the computing device 105, where the GUI is configured for receiving user input indicative of one or more features of a communication specification 111A, 111B. For example, the GUI may include one or more queries, surveys, and/or the like that prompt a user of the computing device 105 (e.g., an author of the communication specification) to indicate whether a particular feature is present in the communication specification 111A, 111B. The apparatus 200 may generate one or more features of the communication specification 111A, 111B based at least in part on user input to the GUI.

For example, the apparatus 200 may determine that the communication specification 111B includes a chipset configuration from Texas Instrument and whether said chipset configuration includes type cc2640 or type cc2650. As another example, the apparatus 200 may determine whether a Bluetooth application or Bluetooth-enabled device uses elliptic-curve Diffie-Hellman (ECDH) for pairing key generation and, if so, whether validation is performed for both the X and Y coordinates that are being shared by a pairing device. In another example, the apparatus 200 may determine whether a Bluetooth-enabled device supports multiple input/output (IO) capabilities, such as having a display and user input available. Further, the apparatus 200 may determine whether the communication specification 111A, 111B restricts the pairing method settings thereof to support only a single pairing method. In still another example, the apparatus 200 may determine whether a Bluetooth-enabled device is associated with one of a plurality of Bluetooth device classifications, types, and/or the like that are included in one or more catalogs of devices known to be susceptible to a particular vulnerability or family of vulnerabilities, such as one or more SweynTooth exploitations. As a further example, the apparatus 200 may determine whether a Bluetooth-enabled device supports both LE mode and BR/EDR mode and, if so, whether the communication specification 111A, 111B includes implementation of cross transport key derivation (CTKD) to prevent overwriting of keys.

In some embodiments, the apparatus 200 is configured to determine one or more vulnerabilities with which the communication specification 111A, 111B is associated based at least in part on one or more identified features. In some embodiments, the apparatus 200 performs a querying process using one or more lookup tables and identified features to generate associations between the communication specification 111A, 111B and one or more vulnerabilities. Additionally, or alternatively, in some embodiments, the apparatus 200 executes a decision tree model and/or the like to map one or more features of a communication specification 111A, 111B to one or more vulnerabilities. Additionally, or alternatively, in some embodiments, the apparatus 200 compares the one or more features to one or more historical communication specifications also demonstrating the features and for which the corresponding devices were successfully targeted via one or more vulnerabilities. Additionally, or alternatively, in some embodiments, the apparatus 200 communicates with one or more remote computing environments (e.g., external systems, platforms, services, and/or the like) to initiate a query based at least in part on one or more features. In such contexts, the query may request an indication as to whether the one or more features are associated with a vulnerability. The apparatus 200 may receive a response form the remote computing environment indicating one or more vulnerabilities that are definitively associated with, potentially associated with, or unassociated with the one or more features.

For example, in response to determining that the communication specification 111B includes a chipset configuration includes type cc2640 or type cc2650, the apparatus 200 may determine that the communication specification 111A, 111B is associated with one or more BleedingBit vulnerabilities. As another example, in response to determining that a Bluetooth application or Bluetooth-enabled device uses elliptic-curve Diffie-Hellman (ECDH) for pairing key generation and validation of both X and Y coordinates is not performed, the apparatus 200 may determine that the communication specification 111A, 111B is vulnerable to fixed-coordinate invalid curve exploits. In another example, in response to determining that a Bluetooth-enabled device supports multiple input/output (IO) capabilities and does not restrict the pairing method settings thereof to support only a single pairing method, the apparatus 200 may determine that the communication specification 111A, 111B is associated with one or more pairing method confusion vulnerabilities. In still another example, the apparatus 200 may determine that the communication specification 111A, 111B is associated with one or more SweynTooth exploitations based at least in part on a match between one or more features of the communication specification and one or more entries of a catalog of devices known to be susceptible to SweynTooth exploitations. As a further example, in response to determining that a Bluetooth-enabled device supports both LE mode and BR/EDR mode and does not implement CTKD, the apparatus 200 may determine that the communication specification 111A, 111B is vulnerable to one or more BLURtooth exploitations.

In some embodiments, the apparatus 200 is configured to generate one or more mitigation operations 113 based at least in part on one or more features of a communication specification 111A, 111B, one or more vulnerabilities, and/or the like. In some embodiments, the apparatus 200 executes one or more models to generate a mitigation operation 113. For example, the apparatus 200 may execute a decision tree model to map a vulnerability to one or more possible mitigation operations 113. As another example, the apparatus 200 may perform a query operation on one or more lookup tables based at least in part on a vulnerability, one or more features, and/or the like. The apparatus 200 may obtain, as output, one or more mitigation operations 113 associated with reducing the vulnerability. In another example, the apparatus 200 may communicate with one or more remote computing environments to retrieve or request one or more mitigation operations 113 for reducing the vulnerability. For example, the apparatus 200 may index a remote relational database of historical vulnerabilities and mitigation operations 113 to obtain a subset of historical mitigation operations 113 with which a particular vulnerability is associated.

For example, in response to determining that the communication specification 111A, 111B is associated with one or more BleedingBit vulnerabilities, the apparatus 200 may generate a mitigation operation including updating a chipset configuration indicated by the communication specification. As another example, in response to determining that the communication specification 111A, 111B is vulnerable to fixed-coordinate invalid curve exploits, the apparatus 200 may generate a mitigation operation for enforcing checking for valid curve points (e.g., do not accept any curve points where the Y value equals zero). In another example, in response to determining that the communication specification 111A, 111B is associated with one or more pairing method confusion vulnerabilities, the apparatus 200 may generate a mitigation operation for setting I/O capabilities of the pairing devices that restrict the association model of pairing to one specific pairing method (e.g., only allowing pairing to be performed with one type of association model). In still another example, in response to determining that the communication specification 111A, 111B vulnerable to one or more SweynTooth exploitations, the apparatus 200 may generate a mitigation operation of installing one or more appropriate software patches on devices with which the communication specification is associated. As a further example, in response to determining that the communication specification 111A, 111B is vulnerable to one or more BLURtooth exploitations, the apparatus 200 may generate a mitigation operation for disabling the BD/EDR mode of the associated device (e.g., by causing the device to run the command "btmgmt bredr off").

In some embodiments, the apparatus 200 is configured to generate impact scores for a plurality of potential mitigation operations 113 that may be implemented responsive to the vulnerability. As one example, in response to determining that a communication specification 111A, 111B is associated with a vulnerability to a key hierarchy enumeration exploit, the apparatus 200 may generate a respective impact score for a plurality of mitigation operations including using 128-bit random generation for key generation, enforcing pin entry for pairing, or implementing a numeric compression association model in pairing. The impact score may indicate a likelihood of reducing the key hierarchy enumeration vulnerability upon implementation of the corresponding mitigation action. For example, enforcement of 128-bit random generation for key generation may be associated with a first impact score, enforcement of pin entry for pairing may be associated with a second impact score that is less than the first impact score, and implementation of a numeric compression association model in pairing may be associated with a third impact score that is less than the first impact score and greater than the second impact score.

In some embodiments, the apparatus 200 generates a ranking 115 based at least in part on the impact scores. For example, in the above context, the apparatus 200 may generate a ranking 115 based at least in part on the first, second, and third impact scores. A top-ranked entry of the ranking 115 may include enforcement of 128-bit random generation for key generation and a lowest ranked entry may include enforcement of pin entry for pairing, which may be associated with a lower impact score due to susceptibility to unauthorized observation of or access to the pairing pin.

In some embodiments, the apparatus 200 is configured to generate a recommendation 117 indicative of one or more mitigation operations 113, rankings 115, vulnerabilities, and/or the like. In some embodiments, the apparatus 200 is configured to provision the recommendation 117 to one or more computing devices 105. For example, the apparatus 200 may provision a recommendation 117 to a computing device 105 with which a communication specification 111A, 111B is associated. In some embodiments, the apparatus 200 is configured to cause rendering of a GUI comprising the recommendation 117 on a display 119 of the computing device 105. In some embodiments, the apparatus 200 is configured to perform one or mitigation operations 113. For example, the apparatus 200 may modify one or more portions of a communication specification 111A, 111B based at least in part on a mitigation operation 113. In some embodiments, the apparatus 200 automatically modifies a communication specification 111A, 111B in response to user input and/or generating a mitigation operation 113. In some embodiments, the apparatus 200 causes updating of firmware, software, hardware, and/or the like of one or more Bluetooth-enabled devices of a vehicle 101 (e.g., vehicle management system 106, sensors 108, computing devices 109, and/or the like). In some embodiments, the apparatus 200 causes modification one or more settings, configurations, parameters, modes, and/or the like of one or more Bluetooth-enabled devices of a vehicle 101.

In some embodiments, the vulnerability mitigation system 103, vehicle 101, computing device 105, and/or the like are communicable over one or more communications network(s), for example the communications network(s) 150. It should be appreciated that the communications network 150 in some embodiments is embodied in any of a myriad of network configurations. In some embodiments, the communications network 150 embodies a public network (e.g., the Internet). In some embodiments, the communications network 150 embodies a private network (e.g., an internal, localized, and/or closed-off network between particular devices). In some other embodiments, the communications network 150 embodies a hybrid network (e.g., a network enabling internal communications between particular connected devices and external communications with other devices). In some embodiments, the communications network 150 embodies a satellite-based communication network. Additionally, or alternatively, in some embodiments, the communications network 150 embodies a radio-based communication network that enables communication between the apparatus 200 and the computing device 105, vehicle 101, and/or the like. For example, the apparatus 200 may provision instructions or commands for modifying Bluetooth settings, parameters, configurations, and/or the like via a transponder, communication gateway, and/or the like. The communications network 150 in some embodiments may include one or more transponders, satellites, base station(s), relay(s), router(s), switch(es), cell tower(s), communications cable(s) and/or associated routing station(s), and/or the like. In some embodiments, the communications network 150 includes one or more user-controlled computing device(s) (e.g., a user owner router and/or modem) and/or one or more external utility devices (e.g., Internet service provider communication tower(s) and/or other device(s)).

Each of the components of the system communicatively coupled to transmit data to and/or receive data from one another over the same or different wireless or wired networks embodying the communications network 150. Such configuration(s) include, without limitation, a wired or wireless Personal Area Network (PAN), Local Area Network (LAN), Metropolitan Area Network (MAN), Wide Area Network (WAN), satellite network, radio network, and/or the like. Additionally, while FIG. 1 illustrate certain system entities as separate, standalone entities communicating over the communications network 150, the various embodiments are not limited to this particular architecture. In other embodiments, one or more computing entities share one or more components, hardware, and/or the like, or otherwise are embodied by a single computing device such that connection(s) between the computing entities are over the communications network 150 are altered and/or rendered unnecessary.

FIG. 2 illustrates a block diagram of an example apparatus 200 that may be specially configured in accordance with at least some example embodiments of the present disclosure. The apparatus 200 may carry out functionality and processes described herein to obtain features of communication specifications, generate vulnerabilities of communication specifications, determine mitigation actions, generate recommendations, generating rankings, provision recommendations, cause performance of mitigation actions, and/or the like. In some embodiments, the apparatus 200 includes a processor 201, memory 203, communications circuitry 205, input/output circuitry 207, vulnerability detection circuitry 209, and mitigation operation circuitry 212. In some embodiments, the apparatus 200 is configured, using one or more of the processor 201, memory 203, communications circuitry 205, input/output circuitry 207, and/or vulnerability detection circuitry 209, and/or mitigation operation circuitry 212, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, controlling, modifying, restoring, processing, displaying, storing, determining, creating/generating, predicting, monitoring, evaluating, comparing, and/or similar terms used herein interchangeably. In one embodiment, these functions, operations, and/or processes may be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally, or alternatively, in some embodiments, other elements of the apparatus 200 provide or supplement the functionality of another particular set of circuitry. For example, the processor 201 in some embodiments provides processing functionality to any of the sets of circuitry, the memory 203 provides storage functionality to any of the sets of circuitry, the communications circuitry 205 provides network interface functionality to any of the sets of circuitry, and/or the like.

In some embodiments, the processor 201 (and/or co-processor or any other processing circuitry assisting or otherwise associated with the processor) is/are in communication with the memory 203 via a bus for passing information among components of the apparatus 200. In some embodiments, for example, the memory 203 is non-transitory and may include, for example, one or more volatile and/or non-volatile memories. In other words, for example, the memory 203 in some embodiments includes or embodies an electronic storage device (e.g., a computer readable storage medium). In some embodiments, the memory 203 is configured to store information, data, content, applications, instructions, or the like, for enabling the apparatus 200 to carry out various functions in accordance with example embodiments of the present disclosure (e.g., obtaining features of communication specifications, determining vulnerabilities, generating mitigation operations and recommendations, and/or the like). In some embodiments, the memory 203 is embodied as a data store 107 as shown in FIG. 1 and described herein. In some embodiments, the memory 203 includes communication specifications 111B, vulnerability data 112, mitigation operations 113, rankings 115, recommendations 117, impact scores, vulnerabilities, and/or the like, as further architected in FIG. 3 and described herein.

The processor 201 may be embodied in a number of different ways. For example, in some embodiments, the processor 201 includes one or more processing devices configured to perform independently. Additionally, or alternatively, in some embodiments, the processor 201 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 201 is configured to execute instructions stored in the memory 203 or otherwise accessible to the processor. Additionally, or alternatively, the processor 201 in some embodiments is configured to execute hard-coded functionality. As such, whether configured by hardware or software methods, or by a combination thereof, the processor 201 represents an entity (e.g., physically embodied in circuitry) capable of performing operations according to an embodiment of the present disclosure while configured accordingly. Additionally, or alternatively, as another example in some example embodiments, when the processor 201 is embodied as an executor of software instructions, the instructions specifically configure the processor 201 to perform the algorithms embodied in the specific operations described herein when such instructions are executed.

As one particular example embodiment, the processor 201 is configured to perform various operations associated with obtaining features of a communication specification, generating vulnerabilities, determining mitigation actions, and generating and provisioning recommendations. In some embodiments, the processor 201 includes hardware, software, firmware, and/or the like, that and/or the like that process communication specifications, vehicle data, vulnerability data, and/or the like to enable the vulnerability detection circuitry 209 to generate one or vulnerabilities. For example, the processor 201 may perform optical character recognition, image recognition, diagram recognition, and/or the like to extract content from communication specifications for analysis. As another example, the processor 201 may generate and cause rendering of GUIs on a computing device 105. As another example, the processor 201 may cause performance of a mitigation operation, such as by modifying (or causing the computing device 105 to modify) a communication specification. As another example, the processor 201 may obtain vulnerability data, mitigation operations, rankings, and/or the like from one or more remote computing environments, historical communication specifications, and/or the like and store the information in memory 203.

In some embodiments, the apparatus 200 includes input/output circuitry 207 that provides output to a user (e.g., a user of a computing device 105, operator of a vehicle 101, and/or the like) and, in some embodiments, receives an indication of a user input. For example, in some contexts, the input/output circuitry 207 provides output to and receives input from one or more computing devices 105. In some embodiments, the input/output circuitry 207 is in communication with the processor 201 to provide such functionality. The input/output circuitry 207 may comprise one or more user interface(s) and in some embodiments includes a display that comprises the interface(s) rendered as a web user interface, an application user interface, a user device, a backend system, or the like. In some embodiments, the input/output circuitry 207 also includes a keyboard, a mouse, a joystick, a touch screen, touch areas, soft keys a microphone, a speaker, and/or other input/output mechanisms. The processor 201 and/or input/output circuitry 207 comprising the processor may be configured to control one or more functions of one or more user interface elements through computer program instructions (e.g., software and/or firmware) stored on a memory accessible to the processor 201 (e.g., memory 203, and/or the like). In some embodiments, the input/output circuitry 207 includes or utilizes a user-facing application to provide input/output functionality to a display of a computing device 105, vehicle 101 and/or other display associated with a user. In some embodiments, the input/output circuitry 207 obtains user input indicative of one or more features of a communication specification.

In some embodiments, the apparatus 200 includes communications circuitry 205. The communications circuitry 205 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 205 includes, for example, a network interface for enabling communications with a wired or wireless communications network, such as the network 150 shown in FIG. 1 and described herein. Additionally, or alternatively in some embodiments, the communications circuitry 205 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 205 includes circuitry for interacting with the antenna(s) and/or other hardware or software to cause transmission of signals via the antenna(s) or to handle receipt of signals received via the antenna(s). In some embodiments, the communications circuitry 205 enables transmission to and/or receipt of data from a vehicle 101, computing device 105, or other external computing devices in communication with the apparatus 200.

The vulnerability detection circuitry 209 includes hardware, software, firmware, and/or a combination thereof, that obtain one or more features of a communication specification and generate one or more vulnerabilities based at least in part on the features, vehicle data, vulnerability data, and/or the like. For example, in some contexts, the vulnerability detection circuitry 209 includes hardware, software, firmware, and/or the like, that perform a querying process using one or more lookup tables and identified features to generate associations between a communication specification and one or more vulnerabilities. In some embodiments, the vulnerability detection circuitry 209 includes hardware, software, firmware, and/or the like, that executes one or more models to map one or more features of a communication specification to one or more vulnerabilities. In some embodiments, the vulnerability detection circuitry 209 includes hardware, software, firmware, and/or the like, that compare one or more features to one or more historical communication specifications also demonstrating the features and for which the corresponding devices were successfully targeted via one or more vulnerabilities (or were previously identified as being susceptible). In some embodiments, the vulnerability detection circuitry 209 includes hardware, software, firmware, and/or the like, that initiate communication with one or more remote computing environments to perform vulnerability detection queries based at least in part on one or more features. In some embodiments, the vulnerability detection circuitry 209 includes a separate processor, specially configured field programmable gate array (FPGA), and/or a specially programmed application specific integrated circuit (ASIC).

The mitigation operation circuitry 212 includes hardware, software, firmware, and/or a combination thereof, that determine one or more mitigation operations for reducing one or more vulnerabilities of a communication specification. For example, in some contexts, the mitigation operation circuitry 212 includes hardware, software, firmware, and/or the like, that execute models, perform lookup operations, communicate with remote computing environments and/or the like to determine one or more mitigation operations based at least in part on one or more vulnerabilities. In some embodiments, the mitigation operation circuitry 212 includes hardware, software, firmware, and/or the like, that generate impact scores for mitigation operations respective to reduction of one or more vulnerabilities. In some embodiments, the mitigation operation circuitry 212 includes hardware, software, firmware, and/or the like, that generate rankings of mitigation operations based at least in part on impact scores. In some embodiments, the mitigation operation circuitry 212 includes hardware, software, firmware, and/or the like, that generate and cause provision of recommendations to a computing device 105. In some embodiments, the mitigation operation circuitry 212 includes hardware, software, firmware, and/or the like, that perform, or cause performance of, one or more mitigation actions. For example, in some contexts, the mitigation operation circuitry 212 includes hardware, software, firmware, and/or the like, that modify a communication specification based at least in part on one or more mitigation actions. In some embodiments, the mitigation operation circuitry 212 includes a separate processor, specially configured field programmable gate array (FPGA), and/or a specially programmed application specific integrated circuit (ASIC).

Additionally, or alternatively, in some embodiments, two or more of the processor 201, memory 203, communications circuitry 205, input/output circuitry 207, vulnerability detection circuitry 209, and/or mitigation operation circuitry 212 are combinable. Additionally, or alternatively, in some embodiments, one or more of the sets of circuitry perform some or all of the functionality described associated with another component. For example, in some embodiments, two or more of the sets of circuitry 201-212 are combined into a single module embodied in hardware, software, firmware, and/or a combination thereof. Similarly, in some embodiments, one or more of the sets of circuitry, for example the memory 203, communication interface 205, vulnerability detection circuitry 209, and/or mitigation operation circuitry 212 is/are combined with the processor 201, such that the processor 201 performs one or more of the operations described above with respect to each of these sets of circuitry 203-212.

Example Data Architecture of the Disclosure

Having described example systems and apparatuses in accordance with embodiments of the present disclosure, example architectures of data in accordance with the present disclosure will now be discussed. In some embodiments, the systems and/or apparatuses described herein maintain data environment(s) that enable the workflows in accordance with the data architectures described herein. For example, in some embodiments, the systems and/or apparatuses described herein function in accordance with the data architectures depicted and described herein with respect to FIG. 3 are maintained via the apparatus 200.

FIG. 3. illustrates an example data architecture 300 in accordance with at least some example embodiments of the present disclosure. In some embodiments, one or more vulnerabilities 301 are generated based at least in part on a communication specification 111, vulnerability data 112, and/or the like. Additionally, in some embodiments, a vulnerability 301 may be generated based at least in part on vehicle data 110, such as one or more current configurations, parameters, pairings, settings, and/or the like of Bluetooth communication occurring within the vehicle 101. In some embodiments, vulnerabilities 301 include general vulnerabilities 302, configuration vulnerabilities 304, design vulnerabilities 306, implementation vulnerabilities 308, and/or the like. In various embodiments, vulnerability data 112 includes respective definitions, classifications, and associated features for the vulnerabilities 301.

In some embodiments, general vulnerabilities 302 include resource draining denial of service (DOS), DOS-based connection jamming, and device spoofing. In some embodiments, resource draining DOS includes controls as to when a computing device, sensor, and/or the like will be broadcasting and turning off the Bluetooth circuit radio during periods where it is not intended to be communicating so as to prevent unauthorized entities from sending stay-awake notices. In some embodiments, DOS through connection jamming relates to whether external radiofrequencies (RF) may penetrate a vehicle to communicate with Bluetooth-enabled devices housed within the vehicle, where such capability may introduce risks of Bluetooth communication jamming. In some embodiments, DOS through connection jamming relates to advertisement intervals for intercepting connection requests. In some embodiments, device spoofing relates to encryption (or lack of encryption) of advertisement data. For example, unauthorized entities may use a shorter advertisement interval, such as 20 ms (e.g., 5× faster than traditional intervals) to ensure they have a higher rate of success intercepting connection requests. For example, if the advertisement data is not encrypted then the Bluetooth broadcasting device may be susceptible to being spoofed by an unauthorized entity who has performed an active scan to discover all the services and characteristics to successfully emulate a target peripheral device. In such contexts, users may be deceived users into connecting to a device of the unauthorized entity rather than their own.

In some embodiments, configuration vulnerabilities 304 include eavesdropping, man-in-the-middle (MITM) operations, and/or the like. In some embodiments, MITM operations may be possible when Bluetooth-enabled devices utilize legacy pairing with a "Just Work" association model. In some embodiments, MITM operations may be possible when Bluetooth-enabled devices utilize Secure Connections pairing mode with a MITM flag not set in the Request and/or Pairing Response packets. Additionally, MITM operations may be possible in Method Confusion-based attempts to exploit a Bluetooth-enabled device. Such configuration vulnerabilities 304 may be present when one or more Bluetooth-enabled devices do not have adequate input/output capabilities to perform pairing, which may be identifiable based on a communication specification 111. Alternatively, or additionally, such configuration vulnerabilities 304 may be present where Bluetooth-enabled device manufacturers utilize fixed passwords instead of passkey or numeric comparison.

In some embodiments, configuration vulnerabilities 304 include replay-based exploitations of Bluetooth-enabled devices. In some embodiments, configuration vulnerabilities 304 304 include relay-based exploits in which an unauthorized entity places an unauthorized Bluetooth-enabled device within the effective range of one or more Bluetooth-enabled devices of the vehicle 101. In some embodiments, configuration vulnerabilities 304 include malicious applications that may be installed on or accessed via one or more Bluetooth-enabled devices of the vehicle 101. In some embodiments, configuration vulnerabilities 304 include weak pairing algorithms utilized by either device of a Bluetooth connection. For example, if one device does not support I/O capabilities the whole pairing/communication may be downgraded to the security mode supported by the least equipped device, which may reduce Bluetooth pairing and communication security. In some embodiments, configuration vulnerabilities 304 include configuration of one or more Bluetooth-enabled devices to debug mode. In some embodiments, configuration vulnerabilities 304 include one or more characteristic permissions. For example, where the principle of least privilege is not implemented in the communication specification, one or more Bluetooth-enabled devices may be allocated excess or improper levels of permissions. In some embodiments, In some embodiments, design vulnerabilities 306 and implementation vulnerabilities 308 include susceptibility to one or more malicious operations that may be performed to exploit, disable, spoof, control, or compromise a Bluetooth enabled device. In some embodiments, a malicious operation includes key negotiation of Bluetooth (KNOB). In some embodiments, a malicious operation includes fixed coordinate invalid curve exploit. In various embodiments, a fixed coordinate invalid curve exploit relates to a shared secret utilized in secure Bluetooth pairing. In some embodiments, the shared secret includes a Diffie-Hellman (DH) key generated by multiplying a device's private key with the peer's public key. When multiplying the point (x, 0) with any private key the result will be (x, 0) (the same point) or a specific point of the curve called Point at infinity (P∞).

In some embodiments, a malicious operation includes BlueMirror, which may embody one or more device impersonation exploits utilizing abuse reflections to expose key information during the pairing procedure. In some embodiments, a malicious operation includes BlueTooth, which may include bypass of authentication keys and/or the like. In some embodiments, a malicious operation includes BLE spoofing attack (BLESA), which may take advantage of improper reconnection logic in the BLE stack to remove the need for authentication upon reconnection. In some embodiments, a malicious operation includes circumvention MITM protection HID, which may refer to a downgrade exploit that enables an unauthorized entity to establish MITM positions. For example, the communication specification 111 may include a vulnerability to MITM protection HID where only the initiating device is authenticated against the target device of the Bluetooth connection (e.g., allowing an unauthorized entity to spoof a MAC and characteristics of an authorized Bluetooth device).

In some embodiments, a malicious operation includes key insertion exploits, such as BLURtooth DOS. In various embodiments, BLURtooth DOS refers to exploitations of dual-mode devices (e.g., devices that support LE and EBR) that use support cross transport key derivation (CTKD) to generate a long term key (LTK) or link key (LK) to overwrite the original LTK or LK. In some embodiments, a malicious operation includes one or more method confusion exploits in which device pairing is attempted using multiple different pairing methods. In such exploits, a stable MITM position may result between the two pairing devices. For example, a method confusion exploit may involve spoofing of the desired device and the victim to connect to the spoofing device while the exploiting entity bridges the connection to the desired device via another interface/BLE connection.

In some embodiments, malicious operations of implementation vulnerabilities 308 include BleedingBIT, InjectaBLE, BrakTooth, BleedingTooth, SweynTooth, and/or the like. In some embodiments, BleedingBIT exploits may Bluetooth chipset vulnerabilities relating to memory corruption conditions, over-the-air-download (OAD) functionality, and/or the like. In some embodiments, InjectaBLE exploits include injection of packets into already existing Bluetooth connections and may cause the affected devices to take action upon inputs defined by an unauthorized entity. In some embodiments, BrakTooth exploits involve continuously crashing or deadlocking Bluetooth-enabled devices, which may result in further exploitative actions including arbitrary code execution. In some embodiments, BleedingTooth includes a series of heap exploitation primitives that may allow RCE or DoS on listening devices. For example, a BleedingTooth exploit may include a heap-based buffer overflow CVE-2020-24490 rooted in the /Bluetooth/hci_event.c file, hci_le_ext_adv_report_evt ( ) function.

In some embodiments, SweynTooth includes various exploits to system-on-a-chip (SOC) BLE implementations. For example, SweynTooth may include crash, deadlock, and security bypass exploits. In some embodiments, SweynTooth crash exploits include link layer length overflow, truncated logical link control and adaptation protocol (L2CAP), silent length overflow, public key crash, invalid L2CAP fragment, key size overflow, invalid sequence memory corruption, invalid channel map, and/or the like. In some embodiments, SweynTooth deadlock exploits include logical link identifier (LLID) deadlock, sequential attribute protocol (ATT) deadlock, invalid connection request, HCI desync, invalid channel map, and/or the like. In some embodiments, SweynTooth security bypass exploits include zero LTK installation, DHcheckskip, and/or the like.

In some embodiments, one or more mitigation operations 113 may be determined based at least in part on one or more vulnerabilities 301, features of communication specifications 111, and/or the like. In some embodiments, the vulnerability mitigation techniques described herein include one or more knowledge bases indicative of associations between vulnerabilities 301 and mitigation operations 113. For example, a mitigation operation 113 for reducing a vulnerability to DoS through connection jamming may include configuring Bluetooth-enabled devices to perform adaptive frequency hopping. As another example, a mitigation operation 113 for reducing a vulnerability to replay exploits may include enforcing data signing, in which after each successful communication the signCounter is incremented and used in conjunction with the connection signature resolving key (CSRK) and message length as inputs to the signing algorithm. As another example, a mitigation operation 113 for reducing a vulnerability to malicious applications may include restricting application installations to applications that are signed and listed in trusted distribution catalogues (e.g., Apple Store, Google Play, and/or the like). Alternatively, or additionally, a second mitigation operation 113 for reducing vulnerability to malicious applications may include enforcing the listing of checksums for end users to enable comparison and verification of whether a downloaded application is legitimate.

In another example, a mitigation operation 113 may include disabling debugging mode on devices outside of debugging and trouble shooting processes. In another example, a mitigation operation 113 may include implementing the principle of least privilege when configuring characteristic permissions. Additionally, or alternatively, a second mitigation operation 113 may include performing an audit of the available characteristics and respective permissions to identify if there are any permissions that have not been configured correctly. In another example, a mitigation operation for reducing vulnerability to identity tracking may include enabling identity resolving keys (IRKs) to mitigate risks of device identities being recorded.

In another example, a mitigation operation 113 for reducing vulnerability to spoofing exploits may include implementing device random addressing, installing software patches, and/or the like. In another example, a mitigation operation 113 for reducing vulnerability to InjectaBLE exploits may include ensuring that packets being transmitted via Bluetooth are encrypted. In still another example, a mitigation operation 113 for reducing vulnerability to BleedingTooth exploits may include checking for length before processing an extended advertising report and confirming that the length is less than or equal to HCI_MAX_AD (e.g., HCI_MAX_AD_LENGTH=31). In various embodiments, mitigation operations 113 include actions, scripts, processes, and/or the like that may be sourced from a remote computing environment. For example, a mitigation operation 113 for reducing vulnerability to one or more SweynTooth exploits, BlueMirror exploits, and/or the like may be obtained from one or more remote databases.

In some embodiments, a respective impact score 303 is generated for a plurality of mitigation operations 113. The impact score 303 may indicate a likelihood of reducing one or more vulnerabilities upon implementation of the corresponding mitigation operation. In some embodiments, an impact score 303 is generated based at least in part on historical vulnerability data 112, historical communication specifications 111, and/or the like. For example, an impact score 303 may be generated based at least in part on historical data indicative of a reduction in successful exploitation of a vulnerability in instances where a mitigation operation is performed and instances where the mitigation operation is not performed. Additionally, or alternatively, in some embodiments, an impact score 303 may be generated based at least in part on a cross-vulnerability analysis of effects of implementing the mitigation operation 113. For example, an impact score 303 of a mitigation operation 113 for a general vulnerability 302 may be lower based at least in part on a determination that implementation of the mitigation 113 may increase susceptibility to an implementation vulnerability 308, design vulnerability 306, configuration vulnerability, and/or the like.

In some embodiments, one or more rankings 115 are generated based at least in part on a plurality of impact scores 303. In some embodiments, one or more recommendations 117 are generated based at least in part one or more mitigation operations 113, rankings 115, and/or the like. In some embodiments, a recommendation 117 is generated based at least in part on a subset of top-ranked entries of a ranking 115. In some embodiments, a communication specification 111 is modified based at least in part one or more mitigation operations 113. For example, a chipset configuration feature may be adjusted based at least in part on a mitigation operation 113. As another example, one or more encryption settings of the communication specification 111 may be adjusted based at least in part on a mitigation operation 113.

Example Processes of the Disclosure

Having described example systems and apparatuses, data architectures, and data flows in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 4 illustrates a flowchart depicting operations of an example process 400 for supporting secure Bluetooth communication frameworks in accordance with at least some example embodiments of the present disclosure. In some embodiments, the process 400 is embodied by computer program code stored on a non-transitory computer-readable storage medium of a computer program product configured for execution to perform the process as depicted and described. Additionally, or alternatively, in some embodiments, the process 400 is performed by one or more specially configured computing devices, such as apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 203 and/or another component depicted and/or described herein and/or otherwise accessible to the apparatus 200, for performing the operations as depicted and described.

In some embodiments, the apparatus 200 is in communication with one or more internal or external apparatus(es), system(s), device(s), and/or the like, to perform one or more of the operations as depicted and described. For example, the apparatus 200 may communicate with one or more computing devices 105, vehicles 101, and/or the like to perform one or more operations of the process 400.

At operation 403, the apparatus 200 includes means such as the communications circuitry 205, the input/output circuitry 207, the processor 201, and/or the like, or a combination thereof, that obtain a communication specification 111 for a vehicle 101. For example, the apparatus 200 may obtain from a computing device 105 a communication specification 111 including one or more features. Alternatively, in some embodiments, the apparatus 200 obtains one or more features of the communication specification 111 without obtaining the communication specification itself. In some embodiments, the apparatus 200 performs one or more optical character recognition processes, keyword recognition processes, image recognition processes, and/or or the like on the communication specification 111 to extract content therefrom and generate one or more features based at least in part on the extracted content. In some embodiments, the apparatus 200 determines one or more operating system versions, software versions, firmware versions, hardware versions, and/or the like with which the communication specification 111 is associated. In some embodiments, the feature includes cryptographic settings, parameters, configurations, techniques, and/or the like. In some embodiments, the feature includes one or more installed patches or a lack thereof.

For example, the apparatus 200 may obtain a feature that indicates a Bluetooth-enabled device is running Android operating system version 10 or a preceding version. As another example, the apparatus 200 may obtain a feature that indicates communication between all paired devices is unencrypted or is not encrypted using an industry recognized algorithm (e.g., RSA, AES, and/or the like). In another example, the apparatus 200 obtains a feature that indicates connection keys are to be derived from a root key. In another example, the apparatus 200 determines a Bluetooth-enabled device is running a particular operating system, such as Linux. The apparatus 200 may further obtain a feature that indicates the version of the Linux Kernal predates a particular version release interval, such as 2021. In still another example, the apparatus 200 may further obtain a feature that indicates entropy of the long term key (LTK) is enforced to a value less than 16 bytes.

At operation 406, the apparatus 200 includes means such as the vulnerability detection circuitry 209, the communications circuitry 205, the input/output circuitry 207, the processor 201, and/or the like, or a combination thereof, that generate one or more vulnerabilities of the communication specification 111. For example, the apparatus 200 may perform one or more queries, execute one or more models, generate one or more historical comparisons, and/or the like based at least in part on the features of operation 403 to generate one or more vulnerabilities. As one example, in response to obtaining a feature that indicates a Bluetooth-enabled device is running operation system Android 10 or less, the apparatus 200 may generate an indication that the communication specification is vulnerable to Bluetooth low energy spoofing attacks (BLESA).

In another example, in response to obtaining a feature that indicates Bluetooth communications are not encrypted using industry recognized algorithms, the apparatus 200 may generate an indication that the communication specification 111 is vulnerable to InjectaBLE exploits. In another example, in response to obtaining a feature that indicates a device is running a Linux operating system with a version of the Linux Kernel before 2021 and lacks one or more patches, the apparatus 200 may generate an indication that the communication specification 111 is vulnerable to BleedingTooth exploits. In another example, in response to obtaining a feature that indicates connection keys are derived from root keys, the apparatus 200 may generate an indication that the communication specification 111 is vulnerable to key hierarchy enumeration exploits. In still another example, in response to the entry of the LTK being unchecked during pairing and unenforced to at least 16 bytes, the apparatus 200 may generate an indication that the communication specification 111 is vulnerable to key negotiation of Bluetooth (KNOB) exploits. In some embodiments, the apparatus 200 causes rendering of a GUI on a display of the computing device 105 with which the communication specification 111 is associated. The GUI may include a coloration scheme, symbology, notation, and/or the like that indicates one or more vulnerabilities of the communication specification 111.

At operation 409, the apparatus 200 includes means such as the mitigation operation circuitry 212, the communications circuitry 205, the input/output circuitry 207, the processor 201, and/or the like, or a combination thereof, that determine one or more mitigation operations 113 for reducing the one or more vulnerabilities. For example, the apparatus 200 may determine one or more mitigation operations based at least in part on the one or more vulnerabilities generated at operation 406. In some embodiments, the apparatus 200 executes one or more models, performs one or more query operations, performs one or more historical data comparisons, and/or the like to determine a mitigation operation for reducing a respective vulnerability.

For example, in response to a vulnerability to BLESA exploits, the apparatus 200 may determine a mitigation operation 113 including updating the version of the Android operating system to version 11 or a subsequent version. As another example, in response to a vulnerability to InjectaBLE exploits, the apparatus 200 may determine a mitigation operation 113 including implementing encryption (e.g., RSA, AES, and/or the like) on all Bluetooth communications of devices onboard the vehicle 101. As another example, in response to a vulnerability to key hierarchy enumeration exploits, the apparatus 200 may determine a mitigation operation 113 including using 128-bit random generation for key generation, enforcing pin entry, implementing numeric compression, and/or the like. In another example, in response to a vulnerability to BleedingTooth exploits, the apparatus 200 may determine a mitigation operation 113 including installing one or more patches. In still another example, in response to a vulnerability to KNOB exploits, the apparatus 200 may determine a mitigation operation 113 including setting SMP_MIN_ENC_KEY_SIZE=16 in net/bluetooth/smp.h, and recompiling and reinstalling the Linux kernel. Additionally, or alternatively, the apparatus 200 may determine a mitigation operation 113 of implementing Bluetooth low energy application layer security add-on (BALSA) as a security measure on the application layer.

At operation 412, the apparatus 200 optionally includes means such as the mitigation operation circuitry 212, the communications circuitry 205, the input/output circuitry 207, the processor 201, and/or the like, or a combination thereof, that generate a respective impact score for a plurality of mitigation operations 113. For example, the apparatus 200 may generate a respective impact score for a plurality of mitigation operations 113 respective to one or more vulnerabilities, where the impact score estimates a likelihood of reducing the one or more vulnerabilities upon implementation. For example, at operation 406, the apparatus 200 may generate a vulnerability to key hierarchy enumeration exploits, and, at operation 409, the apparatus 200 may determine mitigation operations 113 including using 128-bit random generation for key generation, enforcing pin entry, and implementing numeric compression. The apparatus 200 may generate an impact score for each of the determined mitigation operations 113, the impact score indicating a likelihood of reducing susceptibility of one or more devices aboard the vehicle 101 to key hierarchy enumeration exploits.

At operation 415, the apparatus 200 optionally includes means such as the mitigation operation circuitry 212, the communications circuitry 205, the processor 201, and/or the like, or a combination thereof, that generate a ranking 115 of the plurality of mitigation operations 113 based at least in part on impact scores. For example, the apparatus 200 may generate a ranking 115 of a plurality of mitigation operations 113 for reducing one or more vulnerabilities based at least in part on a respective impact score for each operation. For example, based at least in part on respective impact scores, the apparatus 200 may rank mitigation operations 113 of using 128-bit random generation for key generation, enforcing pin entry, and implementing numeric compression. A top-ranked entry of the ranking 115 may embody a mitigation operation 113 that predicted to cause the greatest reduction in one or more vulnerabilities and/or reduce one or more vulnerabilities without increasing susceptibility or introducing additional vulnerabilities.

At operation 418, the apparatus 200 includes means such as the communications circuitry 205, the input/output circuitry 207, the processor 201, and/or the like, or a combination thereof, that provision a recommendation 117 to one or more computing devices 105 associated with the communication specification 111, vehicle 101, and/or the like. For example, the apparatus 200 may generate and provision a recommendation 117 to a computing device 105 associated with an author of the communication specification 111. In some embodiments, the apparatus 200 causes rendering of a GUI comprising the recommendation 117 on a display 119 of the computing device 105. In some embodiments, the recommendation 117 includes one or more mitigation operations 113, one or more rankings 115, one or more vulnerabilities, one or more features of the communication specification 111, and/or the like.

In some embodiments, the recommendation 117, or a GUI comprising the recommendation 117, includes one or more selectable fields for accepting a respective mitigation operation 113. In some embodiments, in response to a receipt of user input selecting a selectable field, the apparatus 200 causes performance of one or more actions respective to the mitigation operation 113 with which the field is associated. For example, in response to the computing device 105 receiving a user input selecting a rendered mitigation operation 113, the apparatus 200 may cause modification of the communication specification 111 based at least in part on the mitigation operation 113 (e.g., operation 421).

At operation 421, the apparatus 200 optionally includes means such as the mitigation operation circuitry 212, the communications circuitry 205, the processor 201, and/or the like, or a combination thereof, that modify the communication specification 111 based at least in part on the one or more mitigation operations 113. For example, the apparatus 200 may modify the communication specification 111 based at least in part on one or more mitigation operations 113, rankings 115, and/or the like. In some embodiments, the apparatus 200 modifies one or more features of, adds one or more features to, or removes one or more features from the communication specification 111. For example, the apparatus 200 may modify an operating system feature to adjust a version of the operating system from an earlier version to a latest version. In another example, the apparatus 200 may add a feature that indicates installation of one or more software patches, firmware patches, and/or the like is to be performed on one or more Bluetooth-enabled devices aboard the vehicle 101. In another example, the apparatus 200 removes a BD/EDR mode from the communication specification 111, which may include adding a feature for execution of command "btmgmt bredr off" on one or more Bluetooth-enabled devices of the vehicle 101. In still another example, the apparatus 200 modifies the communication specification 111 to include implementation of checking for valid curve points. In various embodiments, the apparatus 200 causes modification and/or configuration of one or more Bluetooth-enabled devices of the vehicle 101 based at least in part on the modified communication specification 111.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
obtaining, from a first computing device, at least one feature of a communication specification for a vehicle, wherein:
the communication specification defines one or more data sharing protocols between at least one sensor aboard the vehicle and a vehicle management system or at least one computing device aboard the vehicle and the vehicle management system to enable wireless communication by a Bluetooth communication mode without disabling means of the at least one sensor aboard the vehicle, means of the at least one computing device aboard the vehicle, or means of the vehicle management system for communication by a second mode;
generating at least one vulnerability of the communication specification based at least in part on the at least one feature;
generating a respective impact score for a plurality of mitigation operations determined based at least in part on the at least one vulnerability, wherein the impact score indicates a predicted successfulness of the mitigation operation reducing the at least one vulnerability without introducing an additional vulnerability;
generating a ranking of the plurality of mitigation operations based at least in part on the impact scores; and
providing a recommendation comprising a top-ranked subset of mitigation operations from the ranking to the first computing device.

2. The method of claim 1, wherein:
the at least one feature comprises chipset configuration.

3. The method of claim 1, wherein:
the at least one feature comprises key configuration.

4. The method of claim 1, wherein:
the at least one feature comprises encryption configuration.

5. The method of claim 1, wherein:
the at least one feature comprises operating system version.

6. The method of claim 1, wherein:
the at least one feature comprises at least one supported mode; and
the at least one supported mode comprises at least one of Bluetooth low energy (BLE) or basic rate/enhanced data rate (EDR).

7. The method of claim 1, wherein:
the second mode comprises at least one of wired communication, wireless fidelity (WiFi), or satellite communication (SATCOM).

8. The method of claim 1, wherein:
the top-ranked subset of mitigation operations from the ranking comprises at least one of adjusting at least one setting of the at least one computing device aboard the vehicle, installing at least one program on the at least one computing device aboard the vehicle, or modifying at least one installed program of the at least one computing device aboard the vehicle.

9. The method of claim 1, wherein:
the top-ranked subset of mitigation operations from the ranking comprises at least one of enforcing valid curve points in the Bluetooth communication mode or enforcing encryption in the Bluetooth communication mode.

10. An apparatus comprising at least one processor and at least one non-transitory memory having computer-coded instructions stored thereon that, in execution with at least one processor, cause the apparatus to:
obtain, from a first computing device, at least one feature of a communication specification for a vehicle, wherein:
the communication specification defines one or more data sharing protocols between at least one sensor aboard the vehicle and a vehicle management system or at least one computing device aboard the vehicle and the vehicle management system to enable wireless communication by a Bluetooth communication mode without disabling means of the at least one sensor aboard the vehicle, means of the at least one computing device aboard the vehicle, or means of the vehicle management system for communication by a second mode;
generate at least one vulnerability of the communication specification based at least in part on the at least one feature;
generate a respective impact score for a plurality of mitigation operations determined based at least in part on the at least one vulnerability, wherein the impact score indicates a predicted successfulness of the mitigation operation reducing the at least one vulnerability without introducing an additional vulnerability;
generate a ranking of the plurality of mitigation operations based at least in part on the impact scores; and
provide a recommendation comprising a top-ranked subset of mitigation operations from the ranking to the first computing device.

11. The apparatus of claim 10, wherein:
the at least one vulnerability comprises pairing method confusion.

12. The apparatus of claim 10, wherein:
the at least one vulnerability comprises BleedingBit.

13. The apparatus of claim 10, wherein:
the at least one vulnerability comprises fixed coordinate invalid curve exploit.

14. The apparatus of claim 10, wherein:
the at least one vulnerability comprises SweynTooth.

15. The apparatus of claim 10, wherein:
the at least one vulnerability comprises BLURtooth.

16. The apparatus of claim 10, wherein:
the at least one vulnerability comprises at least one of
bluetooth low energy spoofing attack (BLESA) or
InjectaBLE.

17. The apparatus of claim 10, wherein:
the at least one vulnerability comprises at least one of key
hierarchy enumeration, or key negotiation of Bluetooth
(KNOB).

18. The apparatus of claim 10, wherein:
the instructions, in execution with the at least one pro-
cessor, further cause the apparatus to:
modify the communication specification based at least
in part on the top-ranked subset of mitigation opera-
tions from the ranking.

19. A computer program product comprising at least one
non-transitory computer-readable storage medium having
computer program code stored thereon that, in execution
with at least one processor, is configured to:
obtain, from a first computing device, at least one feature
of a communication specification for a vehicle,
wherein:
the communication specification defines one or more
data sharing protocols between at least one sensor aboard the vehicle and a vehicle management system
or at least one computing device aboard the vehicle
and the vehicle management system to enable wire-
less communication by a Bluetooth communication
mode without disabling means of the at least one
sensor aboard the vehicle, means of the at least one
computing device aboard the vehicle, or means of
the vehicle management system for communication
by a second mode;
generate at least one vulnerability of the communication
specification based at least in part on the at least one
feature;
generate a respective impact score for a plurality of
mitigation operations determined based at least in part
on the at least one vulnerability, wherein the impact
score indicates a predicted successfulness of the miti-
gation operation reducing the at least one vulnerability
without introducing an additional vulnerability;
generate a ranking of the plurality of mitigation opera-
tions based at least in part on the impact scores; and
provide a recommendation comprising a top-ranked sub-
set of mitigation operations from the ranking to the first
computing device.

* * * * *